Nov. 18, 1958 A. G. F. RAMBOLD 2,860,460

CARTONING DEVICE

Filed Feb. 23, 1954 15 Sheets-Sheet 1

INVENTOR

Adolf G.F. Rambold

BY Curtis, Morris & Safford

ATTORNEYS

Nov. 18, 1958 A. G. F. RAMBOLD 2,860,460

CARTONING DEVICE

Filed Feb. 23, 1954 15 Sheets-Sheet 2

INVENTOR

Adolf G.F. Rambold

BY Curtis, Morris & Safford

ATTORNEYS

INVENTOR
Adolf G.F. Rambold
BY Curtis, Morris & Safford
ATTORNEYS

Nov. 18, 1958 A. G. F. RAMBOLD 2,860,460

CARTONING DEVICE

Filed Feb. 23, 1954 15 Sheets-Sheet 4

INVENTOR
Adolf G.F. Rambold

BY Curtis, Morris & Safford
ATTORNEYS

INVENTOR
Adolf G. F. Rambold
BY Curtis, Morris & Safford
ATTORNEYS

Nov. 18, 1958 A. G. F. RAMBOLD 2,860,460

CARTONING DEVICE

Filed Feb. 23, 1954 15 Sheets-Sheet 6

INVENTOR

Adolf G.F. Rambold

BY Curtis, Morris + Safford

ATTORNEYS

Nov. 18, 1958

A. G. F. RAMBOLD 2,860,460

CARTONING DEVICE

Filed Feb. 23, 1954

15 Sheets-Sheet 7

INVENTOR
Adolf G.F. Rambold
BY Curtis, Morris & Safford
ATTORNEYS

Nov. 18, 1958 A. G. F. RAMBOLD 2,860,460

CARTONING DEVICE

Filed Feb. 23, 1954 15 Sheets-Sheet 8

INVENTOR

Adolf G. F. Rambold

BY Curtis, Morris & Safford

ATTORNEYS

CARTONING DEVICE

Filed Feb. 23, 1954 15 Sheets-Sheet 9

INVENTOR
Adolf G. F. Rambold

BY Curtis, Morris & Safford
ATTORNEYS

INVENTOR
Adolf G.F. Rambold
BY Curtis, Morris + Safford
ATTORNEYS

Nov. 18, 1958

A. G. F. RAMBOLD 2,860,460

CARTONING DEVICE

Filed Feb. 23, 1954

15 Sheets-Sheet 11

INVENTOR
Adolf G.F. Rambold

BY
Curtis, Morris & Safford
ATTORNEYS

INVENTOR

Adolf G. F. Rambold

BY Curtis, Morris & Safford

ATTORNEYS

INVENTOR
Adolf G. F. Rambold

BY Curtis, Morris + Safford
ATTORNEYS

Nov. 18, 1958

A. G. F. RAMBOLD 2,860,460

CARTONING DEVICE

Filed Feb. 23, 1954

15 Sheets-Sheet 14

INVENTOR
Adolf G. F. Rambold
BY Curtis, Morris & Safford
ATTORNEYS

INVENTOR
Adolf G.F. Rambold
BY Curtis, Morris & Safford
ATTORNEYS 2,860,460

CARTONING DEVICE

Adolf G. F. Rambold, Viersen, Germany, assignor to Teepack Spezialmaschinen, G. m. b. H., Viersen, Germany, a company of Germany Application February 23, 1954, Serial No. 411,801

22 Claims. (Cl. 53—26)

This invention relates to stacking and packaging individual articles into cartons or the like, and more in particlular to a method and apparatus for stacking and packing articles which are in the form of relatively flat envelopes, each enclosing an individual tea bag or the like.

In my co-pending application Serial No. 276,537, filed March 14, 1952, apparatus is disclosed for producing tea bag packages. That apparatus receives bulk tea, a roll of water-pervious paper from which tea bags are formed, and a roll of paper from which an outside or covering envelope is formed. The tea bag paper is then formed into individual infusion bags each containing two measured quantities of tea. Each of these tea bags is attached to a string for a tag or handle, and is then enclosed within an envelope which is readily openable, and a portion of which is attached to the string and forms the tag or handle. The present invention is directed to apparatus for receiving these tea bag envelopes, or packages of similar shape, and certain aspects of the invention constitute improvements in the over-all production and packaging of the tea bag envelopes.

It is an object of the present invention to provide an improved method and improved apparatus for handling, stacking and packing the flat type of packages, such as those mentioned.

It is a still further object to provide for accomplishing the above objects with apparatus which is compact, relatively simple in its construction and operation, efficient and dependable in use and adaptable to various conditions of operation.

In cartoning certain kinds of articles, it is desirable to provide for accurate counting so that there will be no more nor less than a predetermined number of individual packages in each stack or carton. In the past, difficulties have been encountered because of inaccurate counting particularly when the package producing apparatus operates defectively. For example, apparatus as referred to above produces tea bag packages at a very rapid rate and packages are delivered to the stacking and packing apparatus in quick succession but at precisely timed intervals. However, faulty operating conditions may interfere with the delivery of one or more packages and thus it becomes impossible accurately to count the packages delivered merely by counting the timed intervals. The present invention in one of its many aspects seeks to provide for the accurate counting of the packages as they are received by the packing mechanism even though for one or more of the timed intervals mentioned above no package is received.

A difficulty encountered in connection with the above referred to packages is the tendency for the individual packages to be more bulky at one end than at the other. For this reason it is desirable to stack and pack them with alternate packages reversed end to end so that the bulky ends are not adjacent to each other. The present invention insures that the packages will be packed in this advantageous manner even though one package is by chance omitted in the sequence of production. The above mentioned and other advantages will be in part obvious and in part pointed out below.

Figures 1, 2:
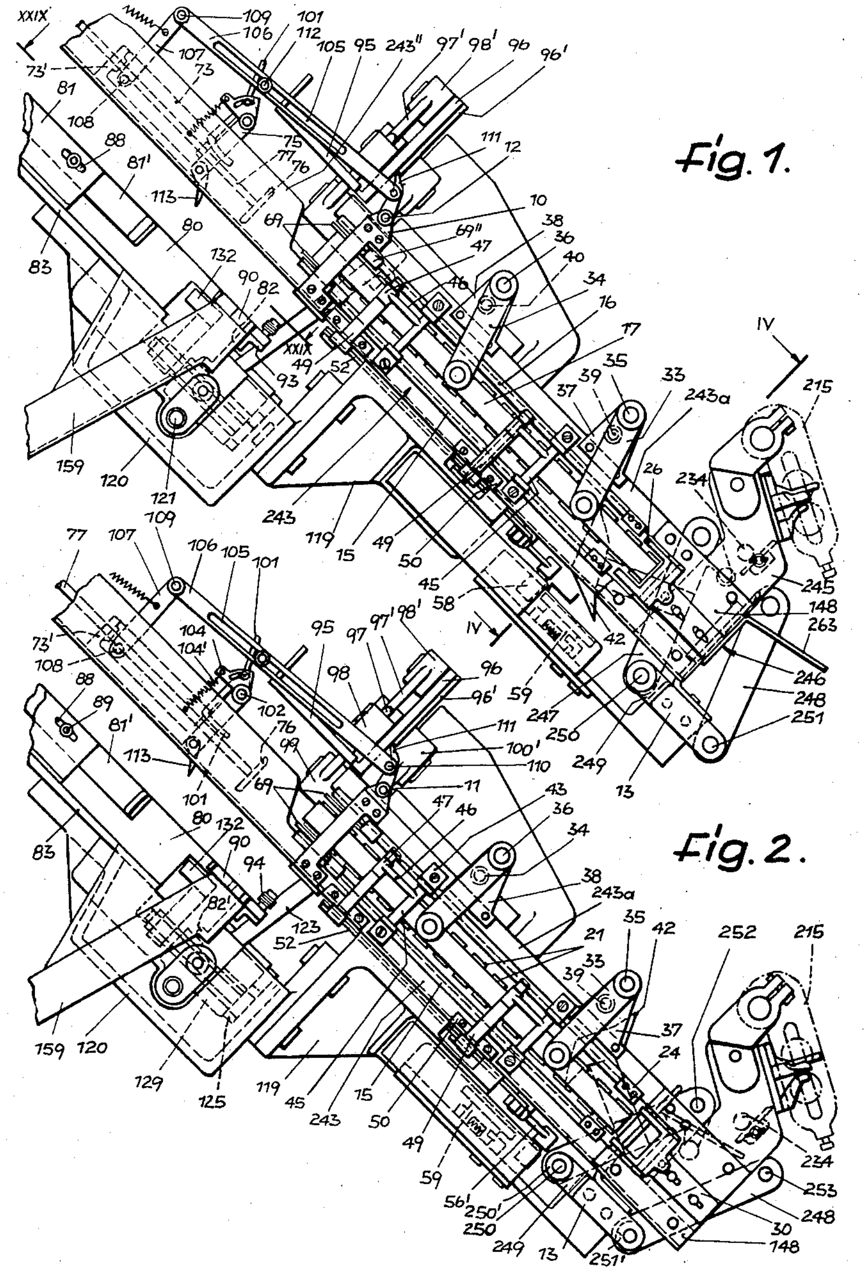
Figure 1 is a side elevation with parts broken away of apparatus constituting one embodiment of the invention.
Figure 2 is a view similar to Figure 1, but showing certain of the elements positioned differently.
Figures 5, 6, 7, 10, 10A:
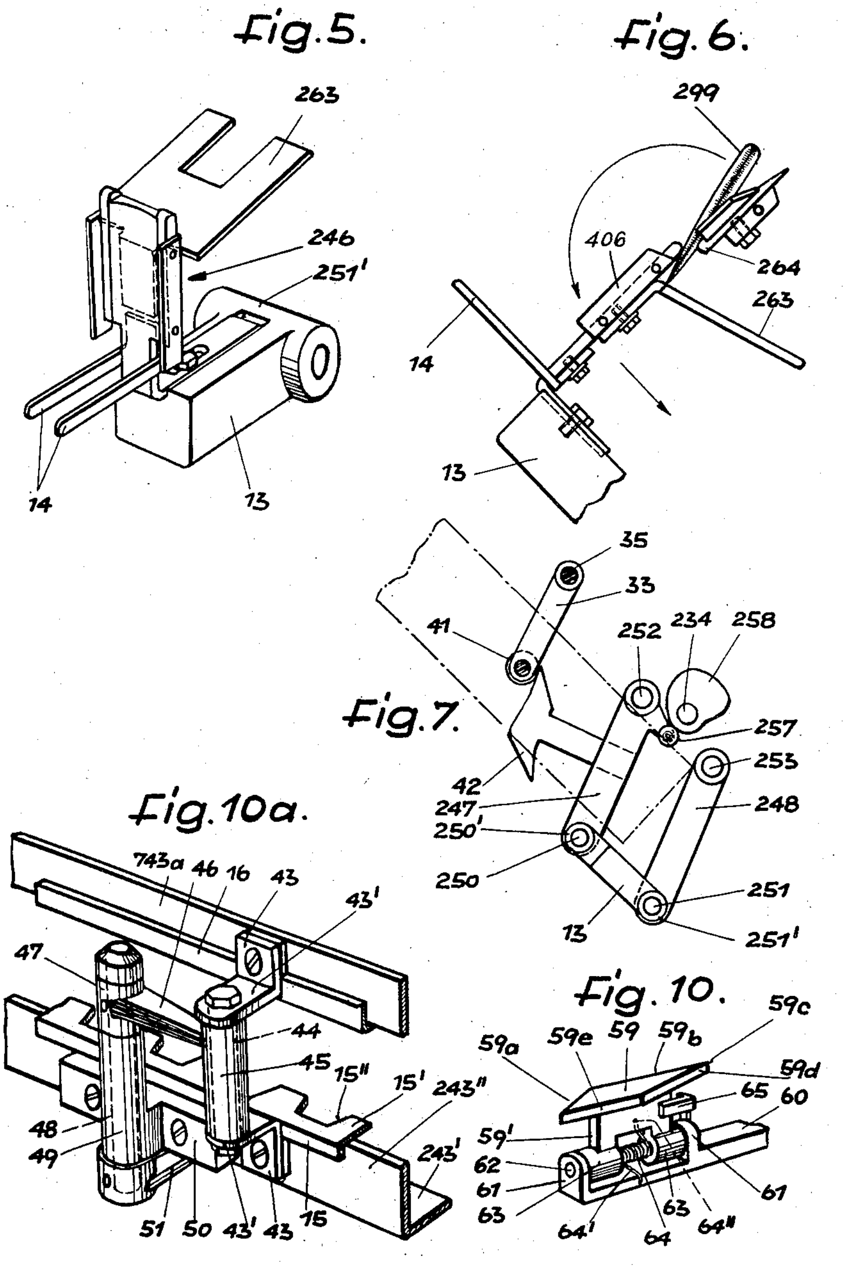
Figure 5 is a perspective view on a somewhat enlarged scale of the package moving slide which also appears in the lower right hand position of Figure 3.
Figure 6 is a somewhat diagrammatic side elevation of the slider of Figure 5 illustrating its package reversing operation.
Figure 7 is a side elevation of the slider and conveyor operating elements.
Figure 10 is a perspective view of the mechanism for moving the package conveyor rails which is shown also in the lower portion of Figure 8.
Figures 8, 9, 11:
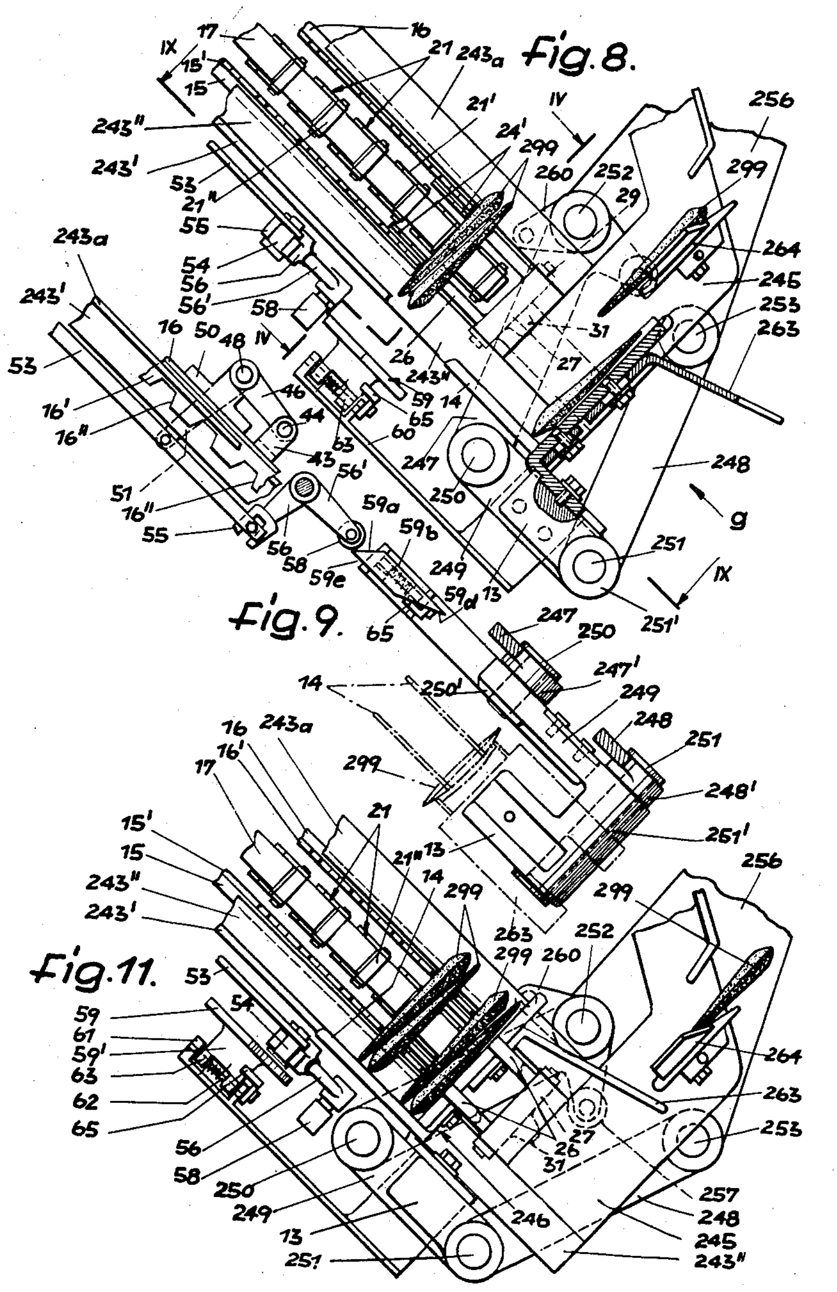
Figure 8 is an enlarged fragmentary sectional view on the line VIII—VIII of Figure 3.
Figure 9 is a sectional view on the line IX—IX of Figure 8.
Figures 12, 13:
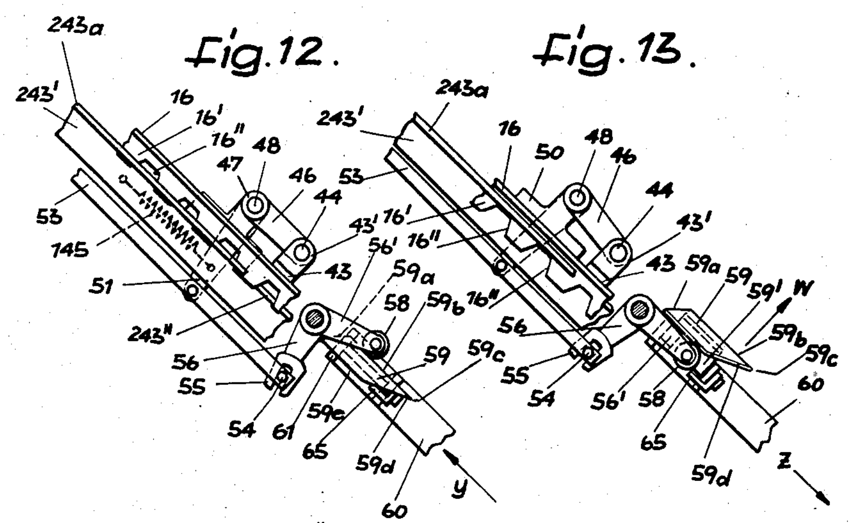
Figure 14:
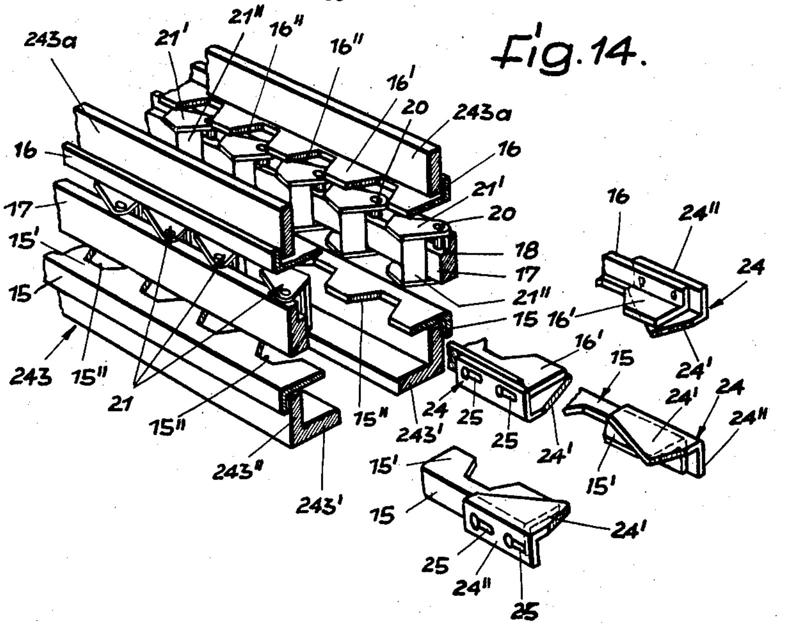
Figure 15:
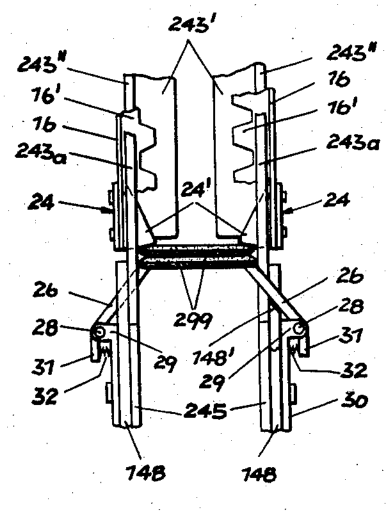
Figure 16:
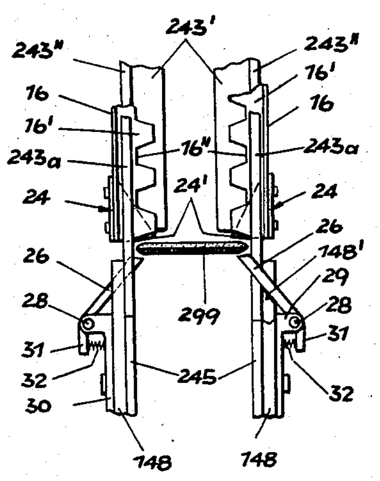
Figure 16A:
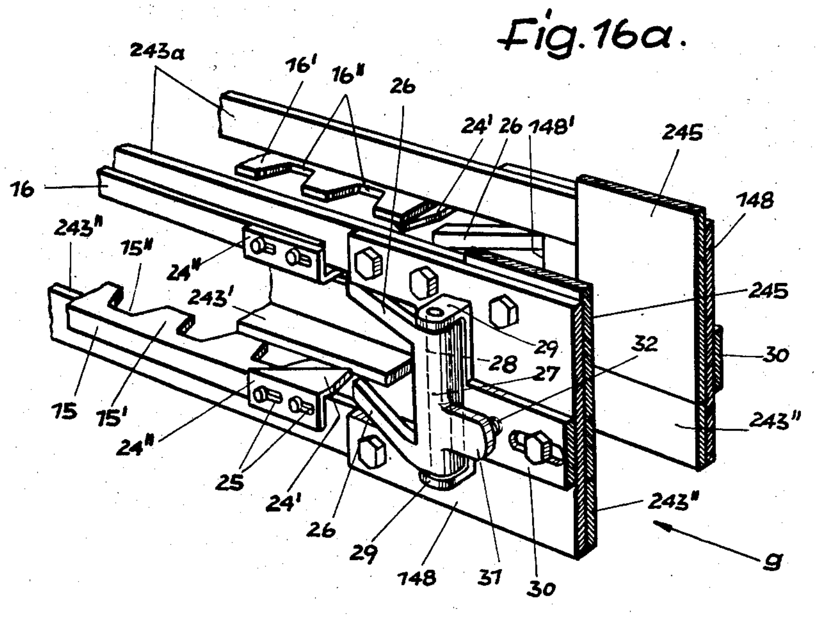
Figures 17, 18:
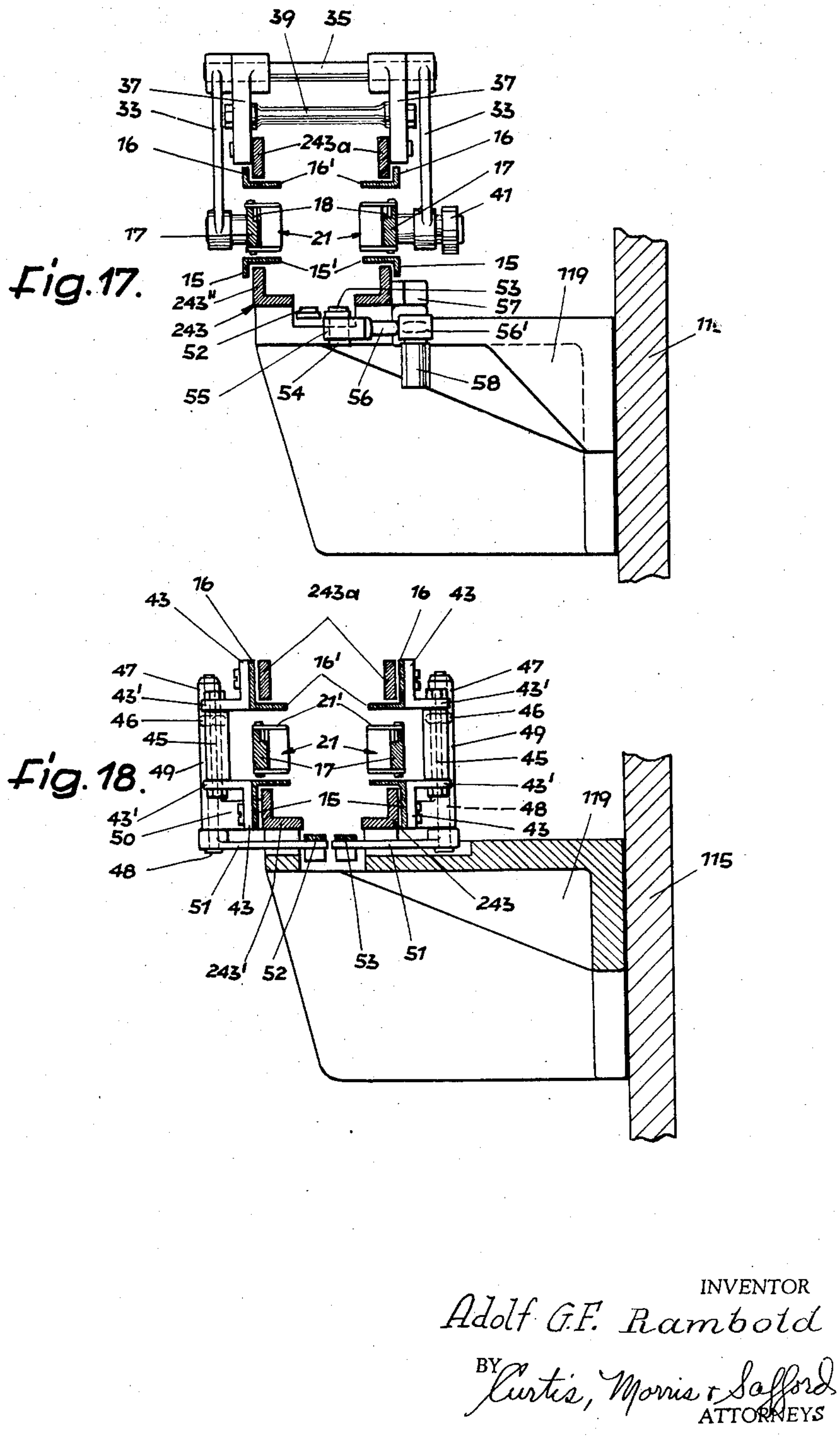
Figure 19:
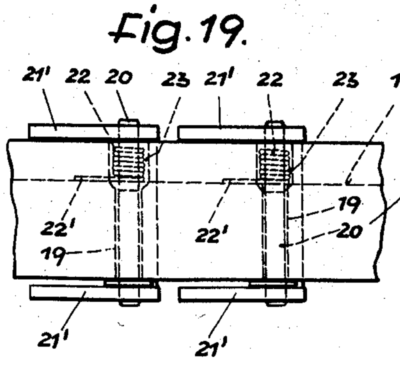
Figure 20:
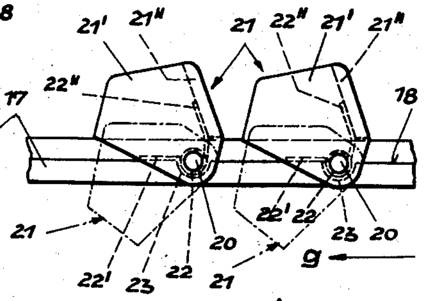
Figure 21:
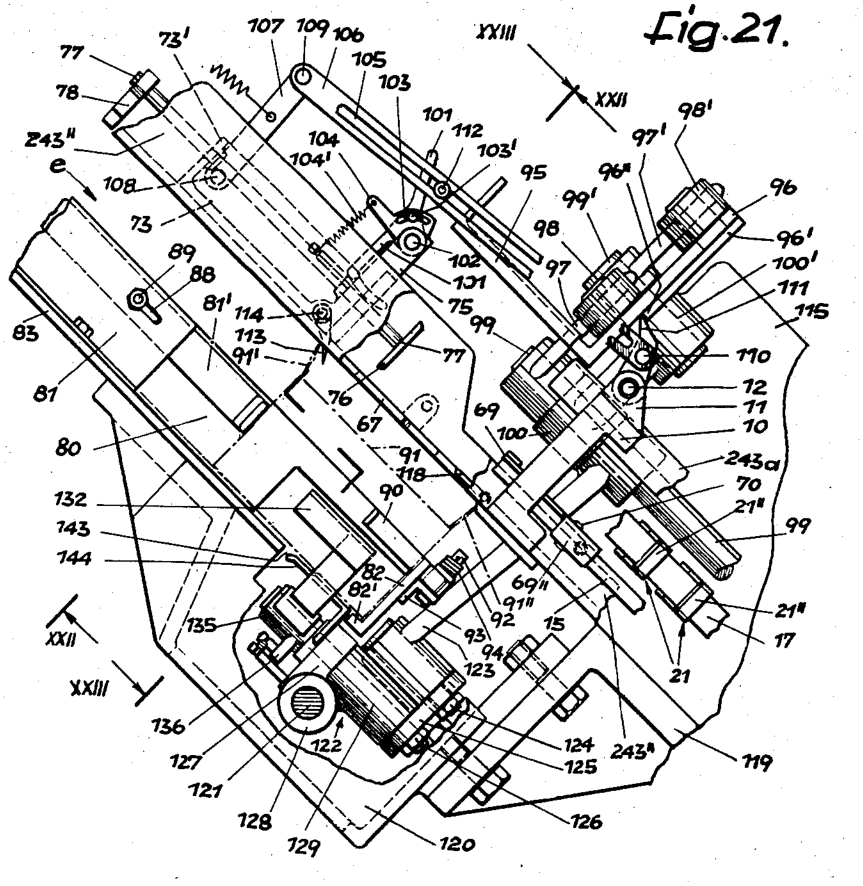
Figure 22:
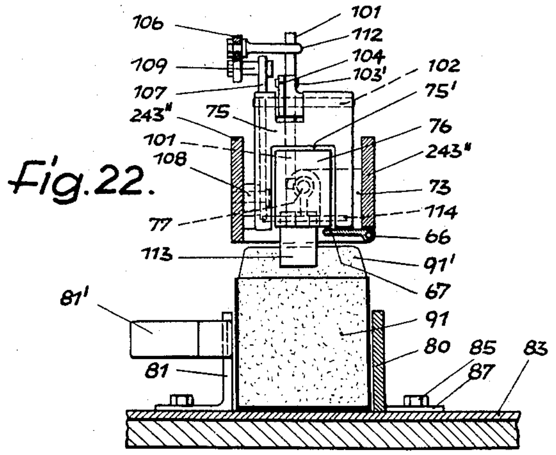
Figure 23:
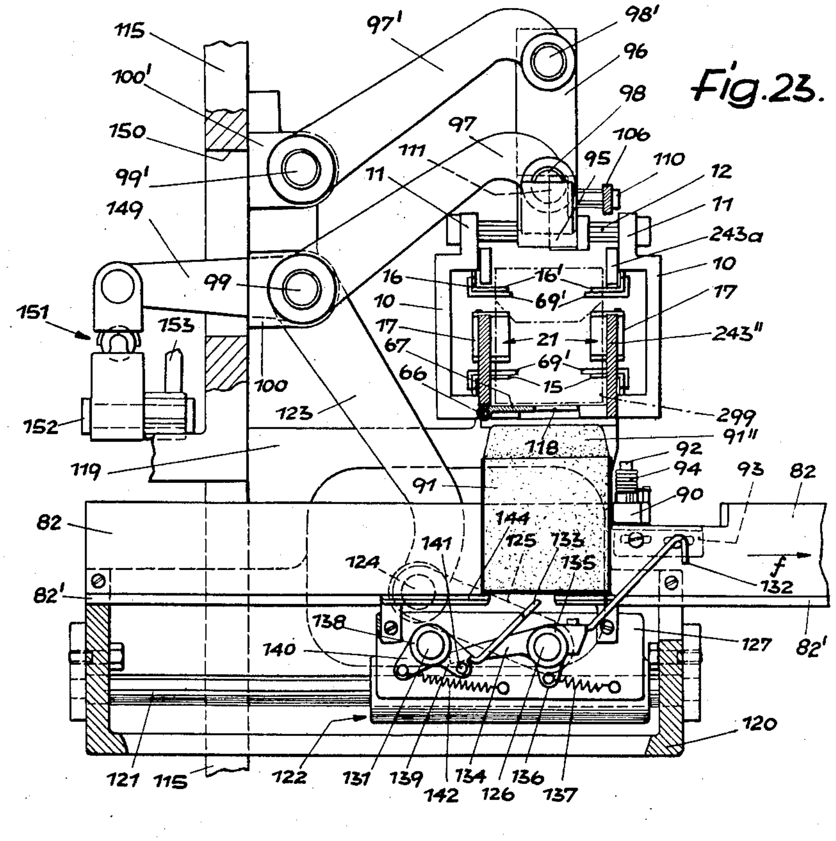
Figure 24:
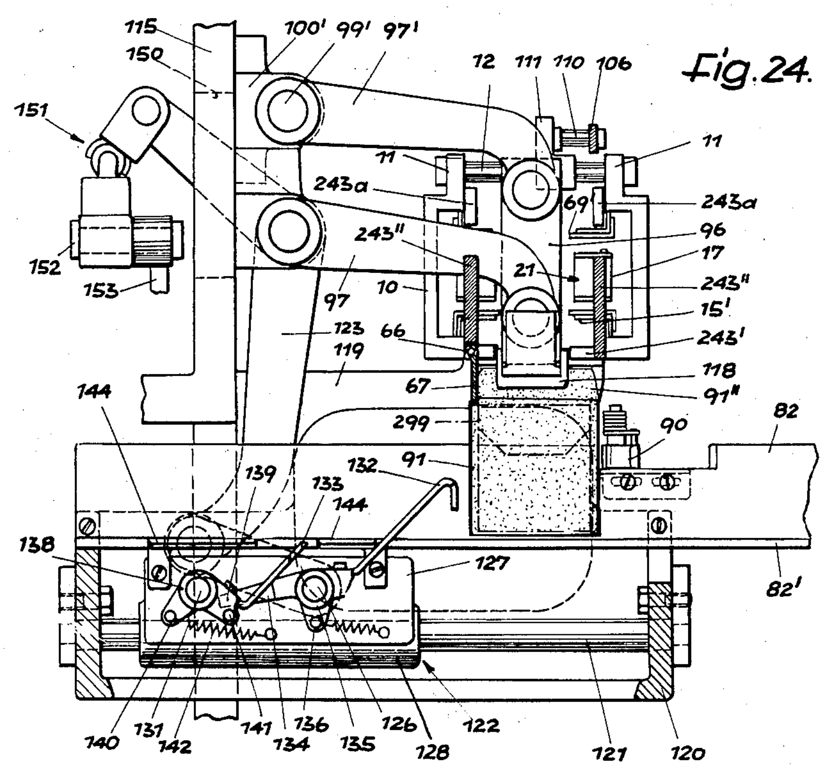
Figures 25, 26, 27:
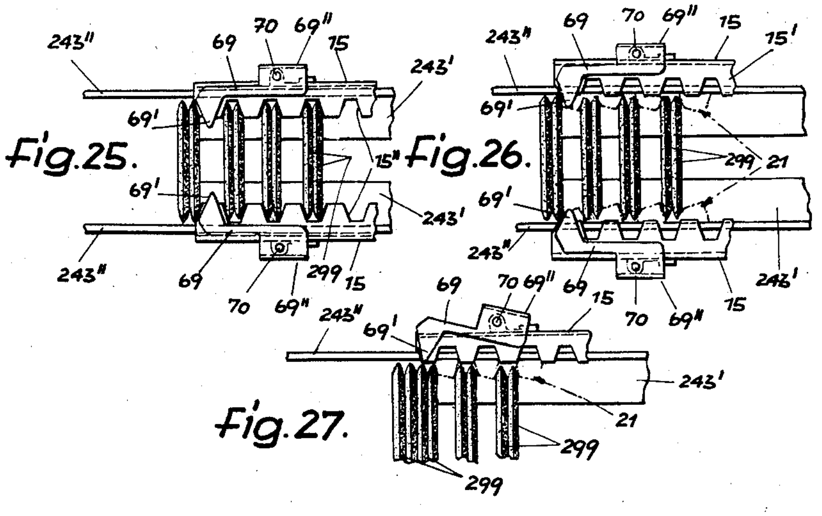
Figure 28:
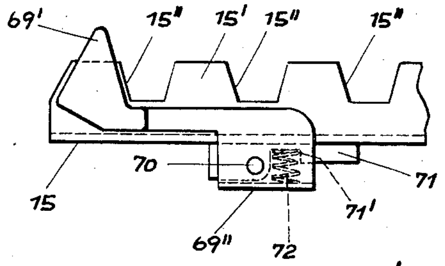
Figures 29, 30:
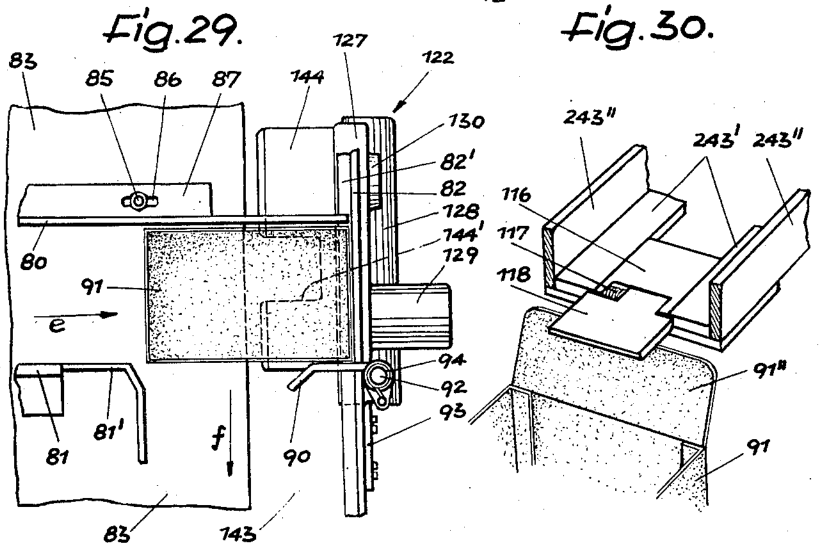
Figure 31:
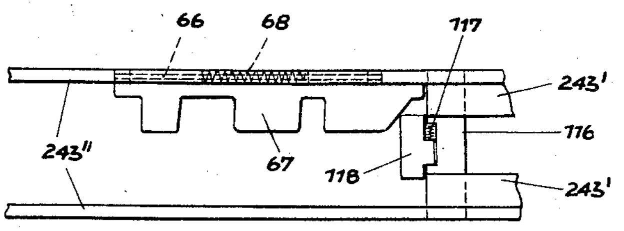
Figure 32:
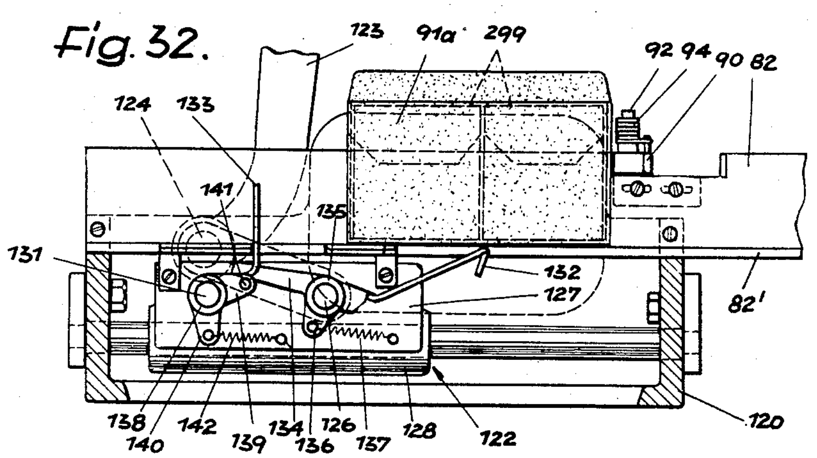
Figures 33, 34:
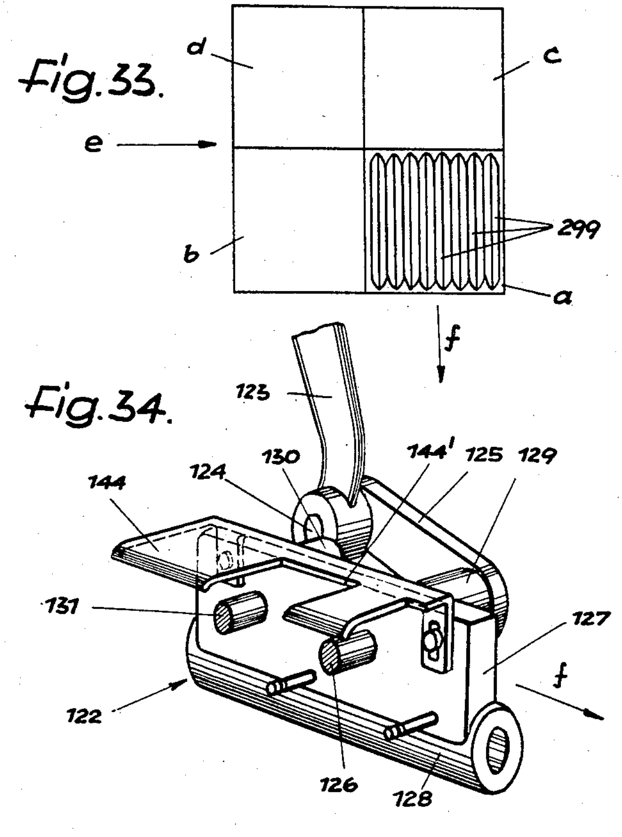
Figures 35, 36:
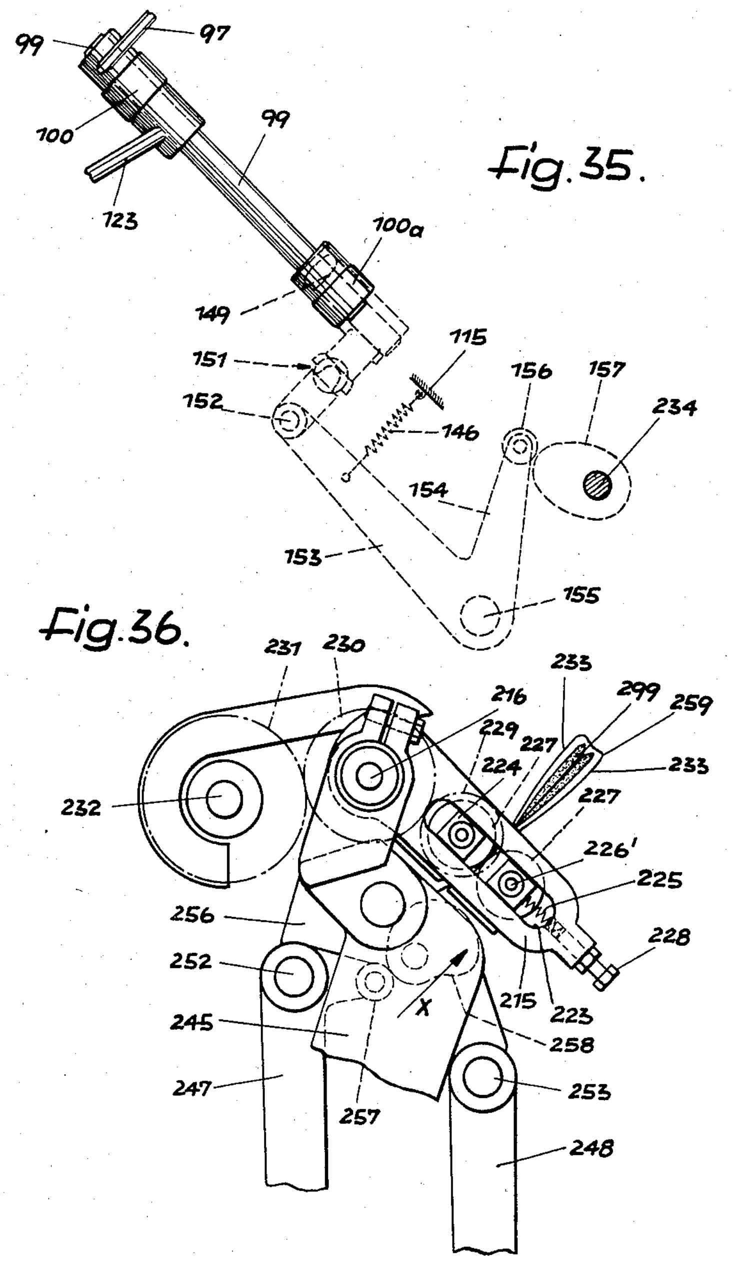
Figure 37:
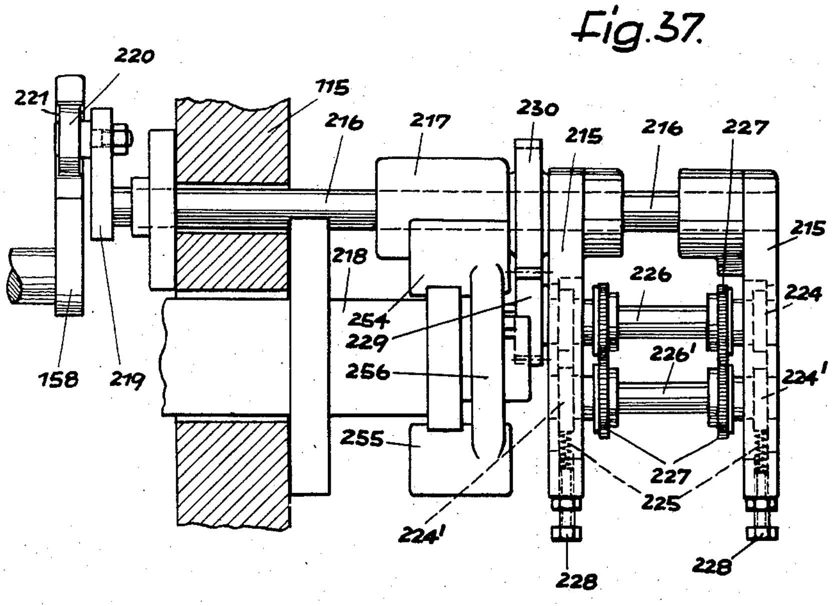

Figure 10*a* is a perspective view of the rail guiding mechanism;

Figure 11 is a view similar to Figure 8, but showing a different relationship of the parts at a subsequent time in the sequence of operations;

Figures 12 and 13 are somewhat schematic representations of the mechanism for operating the package holding rails;

Figure 14 is a fragmentary view showing the package holding and moving rails;

Figures 15 and 16 show somewhat schematic views of the mechanism for holding a pair of packages and these figures illustrate the operation of this mechanism;

Figure 16*a* is a perspective view of the structure of Figures 15 and 16;

Figures 17 and 18 are sectional views respectively on the lines XVII—XVII and XVIII—XVIII;

Figure 19 is an enlarged side elevation of a portion of one of the package moving rails;

Figure 20 is a top plan view of the structure of Figure 19;

Figure 21 is an enlarged side elevation with parts broken away of the mechanism for accumulating or stacking packages and for disposing the stacks into cartons;

Figure 22 is a sectional view on the line XXII—XXII of Figure 21;

Figures 23 and 24 are sectional views on the line XXIII—XXIII of Figure 21 but showing the elements in different positions;

Figures 25, 26 and 27 are top plan views of the adjacent portions of the package moving mechanism and the stacking mechanism, illustrating the package moving and stacking operations;

Figure 28 is an enlarged view of the end of one of the rail assemblies;

Figure 29 is a sectional view on the line XXIX—XXIX of Figure 1;

Figure 30 is a perspective view of the end of the lower conveyor rail assembly;

Figure 31 is a top plan view of the mechanism of Figures 30 and the associated stack holding mechanism;

Figure 32 is a view similar to a portion of Figure 23 but showing a double carton;

Figure 33 is a somewhat schematic top plan view of another type of carton;

Figure 34 is a perspective view of a portion of the mechanism for moving and holding the carton;

Figure 35 is a somewhat schematic view of a portion of the operating mechanism for depositing the packages into cartons and for moving the cartons;

Figure 36 is a fragmentary side elevation of the mechanism for feeding packages to the package moving mechanism;

Figure 37 is a view of a portion of the mechanism of Figure 36.

Figure 38:
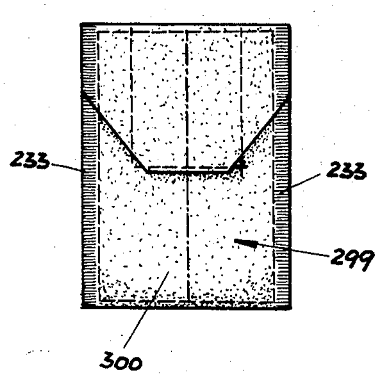
Figure 39:
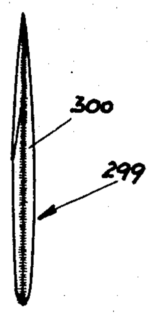
Figures 40A, 40B, 40C, 40D, 40E:
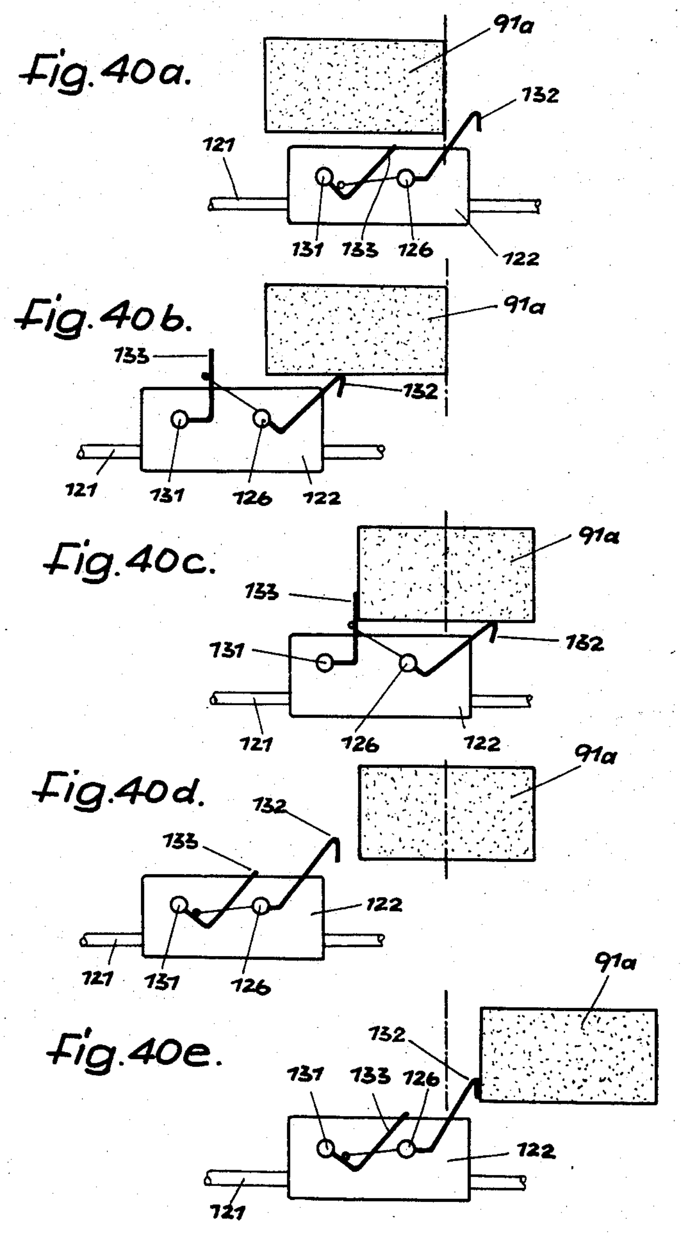

Figures 38 and 39 are views of an individual package; and

Figures 40*a* to 40*e* are schematic representations of the carton handling mechanism.

As has been indicated above, the illustrative embodiment of the present invention is particularly but not exclusively adapted for receiving and packing tea bag envelopes such as shown in Figures 38 and 39, and indicated at 299. Each of these envelopes encloses a tea bag which is enclosed in a paper envelope 300. The final operation in producing the finished envelopes of Figures 38 and 39 is the knurling of the longitudinal side edges 233, and this operation is carried on by the knurling unit shown particularly in Figures 36 and 37. This unit comprises a pair of knurling wheels 226 and 226′ having two pairs of mating knurling rings 227. Knurling wheels 226 are journaled at 224 and 224′ in frames 215, and the wheels are urged together by springs 225, the tension of which is adjusted by set screws 228. Frames 215 are mounted upon a shaft 216 and the unit is held by a frame structure. The envelopes pass through this knurling unit with the top edge (that is the edge at the top of Figures 38 and 39) leading, and the packages emerge in this inverted position as shown in Figures 8 and 11. In an operation performed by part of the mechanism of the invention, alternate bags are inverted as they are received from the knurling unit so that they may be assembled in pairs, with each pair comprising one envelope with its top edge up, and one envelope with its top edge down. The pairs of bags are conveyed to a stack assembling zone by a conveying mechanism, the details of which are shown in Figures 5 to 20. The stacks of envelopes are then placed into cartons by carton handling and packing mechanisms. The mechanism for accumulating or assembling the stacks and for handling the stacks and the cartons is shown in Figures 21 to 35. Generally speaking, in Figures 1, 2, and 3, the envelope receiving and inverting mechanism is shown in the lower and right-hand portions of these figures; the conveying mechanism is shown in the central portions of the figures; and the stack accumulating and stack handling and carton handling mechanism is shown at the left.

Figures 3, 4:
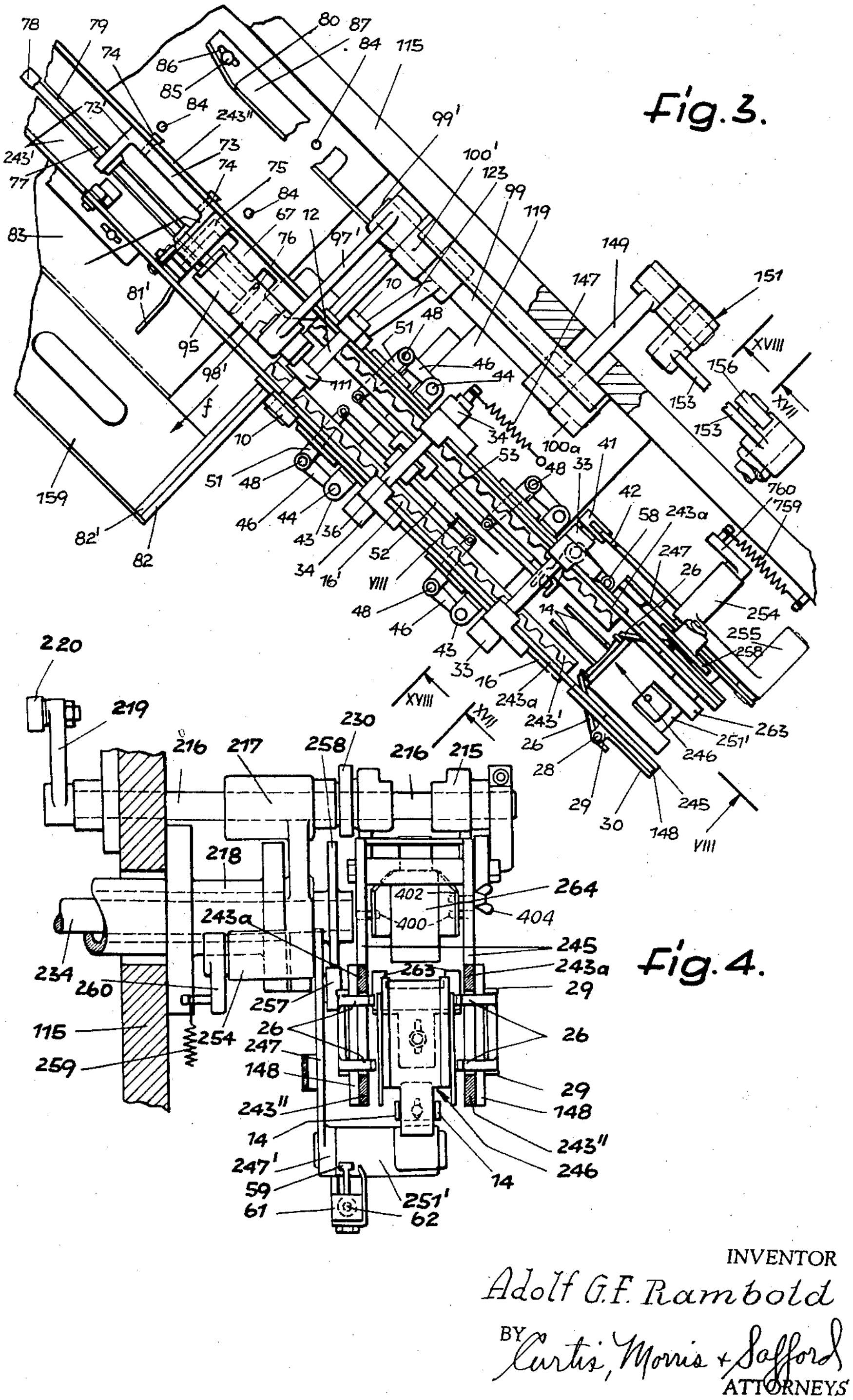
Figure 3 is a top plan view of the apparatus of Figures 1 and 2.
Figure 4 is a sectional view on the line IV—IV of Figure 1.

Referring particularly to Figures 8, 11 and 4, each envelope 299 is discharged from the knurling unit downwardly against a guide plate 264 which has diverging side flanges, and which is mounted between a pair of vertical mounting plates 245 by a pair of pivot pins 400 (Figure 4) and a stud screw 402 which extends through a slot and has a thumb nut 404 which is tightened to hold the plate in adjusted position. Directly beneath plate 264, is an envelope receiving slide, the construction of which is shown best in Figures 5 and 6. This slide has a base 13, upon which is adjustably clamped an upstanding wall 246 which has a pair of side flanges 406, and to which is secured a fork bracket having envelope supporting arms 14. Also clamped to this unit is a somewhat horizontally extending bracket 263 (see Figure 8) which is positioned beneath the top of bracket 246. Base 13 is swingably mounted and has an integral sleeve 251′ through which a stud shaft 251 extends, and a sleeve 250′, through which a stud 250 extends. As shown best in Figure 7, base 13 is supported through these stud shafts by a pair of links 247 and 248, which are in turn supported by a pair of stud shafts 252 and 253. Oscillatory movement is imparted to this base member 13 and the elements carried thereby, by a cam 258 mounted on a shaft 234, and a cam upper roller 257 mounted on an arm extension from link 247. Cam 258 is rotated continuously at a predetermined rate by the machine which produces the tea bag envelopes. In this way the rotation of this shaft is synchronized with the operation of that machine so that the shaft rotates one complete revolution in the time that two complete envelopes are produced.

As indicated above, alternate envelopes are turned from the inverted position to the upright position. This turning is performed automatically by the cooperation of the slide assembly with the guide plate 264. The slide assembly oscillates between the limits indicated in Figures 8 and 11. Assuming that the slide is in the position shown in Figure 9, that envelope 299 is at this time sliding downward, and that the leading edge of the envelope engages bracket 263 at an instant before the slide reaches the position illustrated in Figure 6, as the slide continues to move to the right, the lower end of the envelope is carried with the slide by engagement with the top of the bracket 246. The envelope, however, is pivoted in the direction of the arrow in Figure 6 by virtue of its engagement with the bottom edge of the guide plate 264. The turning effect produced by the relative motion of members 246 and 264 combined with the downward momentum of the envelope causes the envelope to somersault or flip rapidly over the top edge of bracket 246, coming to rest in the position of the lower right envelope shown in Figure 8. The next successive envelope is shown moving down member 264 in Figure 8, and it drops into the slide with its leading edge striking the arms 14 next to the envelope which has just been turned. Thus by virtue of one envelope having its bottom or thick portion down, and the other having its bottom portion up, a pair of envelopes is assembled in a minimum of space. The slide assembly after pairing the envelopes, starts moving to the left and when it reaches the position of Figure 11, it delivers the pair to the conveyor assembly.

The receipt of not one but a pair of envelopes by the conveyor assembly is insured by an envelope-holding unit best shown in Figures 15, 16 and 16*a*. This unit comprises a pair of holding forks mounted respectively upon brackets 30 which are adjustably clamped to side plates 148. Each of the envelope-holding units has a fork member with a central barrel 27 and a pair of integral holding fingers 26. Each of the barrels 27 is supported by a pivot pin 28, which is held at its ends by a pair of ears 29. Each barrel also has an integral lug 37 beneath which there is a compression spring 32. As shown best in Figure 15, these springs urge fingers 26 of the two units toward each other into the path of the envelopes. Hence, referring again to Figure 11, when the slide assembly moves the pair of envelopes to the left just beyond the ends of fingers 26, the fingers move in behind the envelopes. Each of the fingers has a cooperating holding bracket 24 with which the fingers cooperate to hold the pair of envelopes. Each of the brackets 24 has a bracket portion 24′ and an angle portion 24″, which has slots 25 through which clamping screws extend so that the bracket may be adjusted. The clamping force on the envelopes is sufficient to hold them in place, but it is not sufficient to interfere with the moving of the envelopes by the conveyer assembly in the manner discussed below.

As indicated above, normally a pair of complete envelopes is received during each period of oscillation of the member 13. However, faulty conditions of operation might interfere with the supply and receipt of two perfect envelopes during a given period and, in this event, it is contemplated that no envelope be delivered to the conveyer assembly for this cycle. Assuming that only one envelope is delivered to the slide 13 in a particular period, that envelope will be deposited between fingers 26 and brackets 24 in the manner shown in Figure 16. Under such circumstances, the single envelope is not thick enough to be held, and it falls down into a box positioned beneath for that purpose. Similarly, if envelopes are being delivered which do not contain tea bags of sufficient size, they likewise will not be held and will fall down.

The conveyor assembly in general comprises: stationary rail structure which guides the envelopes along a path; four envelope-holding brackets which are moved into the path of the envelopes, and which hold them between the movement steps; and a pair of conveying or envelope-moving units which impart step-by-step movement to the envelopes. Referring first to Figure 14 of the drawings, the stationary rail assembly includes a pair of angle bars 243′ at the bottom, and a pair of rail strips 243*a* at the top. These rails define a rectangular passageway which has a cross section substantially the shape of the flat envelope. The envelope-holding brackets comprise a pair of brackets 15 positioned respectively as shown at the upper edges of angle bars 243′, and a pair of similar brackets 16 resectively at the lower edges of bars 243*a*. Each of the envelope conveying or moving units comprises a bar 17 and a plurality of evenly-spaced swinging brackets 21. Referring to Figures 19 and 20, each of the bars 17 has a cut-away portion along its top edge which provides a ledge at 18, and each bar has vertical holes 19, through which pivot pins 20 extend. Each pivot pin 20 supports one of the swinging brackets 21. These brackets are urged toward the solid-line positions indicated in Figure 20 by springs 22 in a recess 23. Each spring 22 surrounds a corresponding pin 20 and has one end 22″ engaging a bracket, and its other end 22′ engaging bar 17. Each bracket 21 is formed by a pair of plates 21′ and an integral interconnecting bar portion 21″ (see Figure 14). These brackets are rotated periodically to the broken line positions shown in Figure 20, in order to permit free passage of the envelopes at times during the conveying operation.

Referring now to Figure 1, the stationary rail assembly is supported at the right upon plates 148 which in turn are clamped to plates 245. At the left, this rail assembly is supported by a bracket assembly, including side plates 10 rigidly mounted on the base of the machine.

During the conveying operation, the envelope holding brackets 15 and 16 are oscillated between the limits of the envelope holding position as shown by bracket 16 in Figure 13 and the withdrawn position as shown by bracket 16 in Figure 12. To accomplish this, brackets 15 and 16 are mounted at their ends upon oscillating assemblies of the type shown in Figure 10*a* and Figure 18. There are four of these oscillating assemblies positioned in pairs at the sides of the rail assembly as shown in Figures 1, 2 and 3. Each assembly is identical to the others and its construction will best be described in connection with Figure 10*a*.

The adjacent ends of the pair of brackets 15 and 16 as shown in Figure 10*a* are clamped to angle brackets 43 which have ears 43′ between which there is a sleeve 44. This sleeve which is pivoted about bolt 45 running between ears 43′ is rigidly carried upon the free end of a swing arm 46. The other end of arm 46 is fixed to rotatable knuckle 47 which is mounted upon and keyed to a pin 48 extending down through stationary knuckle 49 fastened to the adjacent rail channel 243′. Rigidly fixed to the lower end of pin 48 is an operating lever 51 which, as shown in Figure 3, is attached either to operating bar 52 or bar 53. Bars 52 and 53 are mechanically interconnected by central brackets clamped to them. Bar 53 is driven from its right hand end (see Figures 12 and 13) by pin 54 riding in a fork 55 which is part of crank arm 56. Crank arm 56 is pivoted upon a shaft fixed to the machine frame and is rotated about the shaft axis by operating arm 56′ which carries a roller 58. Adjacent roller 58 is a cam element 59 which has four side edges 59*a*, 59*b*, 59*d* and 59*e* (see Figure 10). Cam element 59 is pivotally mounted upon the end of a bar 60 by knuckles 63 on the cam element, knuckles 61 on the bar and a pin 62 extending through these knuckles. The cam element is urged against a stop 65 by coil spring 64 having ends 64′ and 64″.

Referring again to Figures 12 and 13, the oscillating movement of brackets 15 and 16 will now be described. Starting for convenience from the position in Figure 12 with arm 60 moving in the direction of the arrow *y*, as arm 60 advances, roller 58 rolls along the cam edge 59*b*. The movement of arm 60 continues until the cam element moves beyond the roller and during this time crank arm 56 and the other elements are positioned as shown, that is, operating arm 53 is drawn back forcing operating arm 51 and arm 46 counterclockwise and retracting holding brackets 15 and 16 from their position shown in Figure 13 to the position shown in Figure 12. When the cam element 59 is moved beyond roller 58, spring 145 swings arm 51 clockwise and moves bar 53, crank arm 56 and arm 46 and the envelope holding brackets 15 and 16 to their respective positions shown in Figure 13.

After roller 58 moves free of surface 59*b*, bar 60 starts its return movement in the direction of arrow *z* in Figure 13 and surface 59*d* moves against the roller. This cam surface together with surface 59*e* causes the cam element to be deflected to the position indicated in Figure 13; that is, the cam element is swung against the action of spring 64 (see Figure 10). Spring 145 retains all the elements in the envelope holding position until bar 60, moving in the direction of arrow *z*, carries the cam element past roller 58. Bar 60 then starts to move in the opposite direction, i. e. in the direction of arrow *y*. Continued movement in the *y* direction causes roller 58 to ride up the cam edge 59*a* so that the elements are moved once again to their positions as represented in Figure 12. The motion of bar 60 is caused by the motion of base 13 to which bar 60 is rigidly clamped, as can be seen in Figures 8 and 9.

It has been mentioned that the envelope conveying units formed by bar 17 and associated swinging brackets 21 are oscillated back and forth to impart step-by-step advancing movement to the envelopes. Explaining this action now in detail, in Figures 1 and 2 bars 17 are swingably mounted upon a pair of units, the unit at the right consisting of two opposite supporting links 33 (see Figure 17) and the other (Figures 1 and 2) consisting of two similar supporting links 34. These two supporting units are identical and the one shown in Figure 17 will now be described.

Clamped to each of the top bars 243*a* is a respective one of the brackets 37 which are rigidly attached to each other by cross-member 39. Brackets 37 support a shaft 35, the ends of which project beyond the brackets and provide rotatable supports for the two links 33. Links 33 are in turn swingably attached to the respective bars 17 by studs fixed to them. Since the left hand pair of supporting links 34 is mounted in the same way, it is apparent that the envelope conveying units may be swung freely between the two positions shown in Figures 1 and 2. Referring again to Figure 17, the right side link 33 carries a cam follower roller 41 which (see Figure 3) is adapted to be engaged by the cam surfaces of a cam bracket 42. Cam bracket 42 is rigidly clamped to link 247 which (see Figure 7) cooperates with link 248 to support base member 13 of the oscillating bracket. Accordingly, as links 247 and 248 and the oscillating bracket move, the cam member 42 is moved back and forth in contact with roller 41. As can be seen in Figure 3, spring 147 is attached to the lower end of one of the links 34 so that the envelope conveying units are urged to the right and roller 41 is held against the cam surfaces of cam member 42. Therefore, (see Figure 7) the swinging of link 247 to the left acts through cam member 42 and roller 41 to move the lower part of the adjacent link 33 to the left and this movement is transmitted through the two links 33 to the bars 17 (see Figure 17). As link 247 moves back in completing its cycle, spring 147 causes the envelope conveying units including rails 17 to return to their positions of Figure 1.

Assuming that the conveyor is substantially filled with pairs of envelopes 299, and that these envelopes are to be moved to the left in step-by-step fashion, considering first the condition represented in Figure 25, it is seen from this figure that for the time represented each pair of envelopes 299 is held between the sets of brackets 15 in notches 15''. However, the bracket oscillating mechanism described in connection with Figures 12 and 13 is moving toward the condition shown in Figure 12, and brackets 15 and 16 are being withdrawn to the position of bracket 15 shown in Figure 26. When the brackets are fully withdrawn the envelopes are clamped solely between swinging elements 21 of the envelope conveying units as shown in Figure 26. Link 247, continuing its swing to the left, acts through cam 42 and roller 41 (see Figure 1) to impart a step movement to these conveying units whereby the envelopes are advanced a discrete distance equal to the distance between adjacent notches 15''. During this advance, brackets 15 and 16 are held in their retracted positions shown by the position of bracket 16 in Figure 12. About the time link 247 (Figure 7) reaches its extreme left-hand position, cam element 59 passes beyond roller 58 and spring 145 moves the envelope-holding brackets 15 and 16 back in against the envelopes. The envelope-moving units including rails 17 are then permitted to move back to their right hand limit under the influence of spring 147 and during this movement the swinging brackets 21 are engaged by the adjacent envelopes and are swung back to their broken-line positions shown in Figure 20. When the envelope moving units reach their right hand limit, each pair of envelopes is again clamped between the respective swinging brackets 21 as they return to their solid-line positions shown in Figure 20. As link 247 once more moves to the left, the above described cycle of motion ends and a new one begins.

It has been explained above that, in placing the pairs of envelopes at the left-hand end of the conveyor assembly, each pair is initially delivered there by the slide assembly and held in place by fingers 26 as shown in Figure 15. From this point each pair of envelopes is advanced step-by-step to the stack accumulating mechanism now to be described.

At the left-hand end of each of brackets 15, as well as brackets 16, an envelope stacking bracket 69 is swingably mounted upon a pivot pin 70 (see Figure 28) and a mount block 71. Each of brackets 69 has a tip which normally projects beyond the bracket 15 or bracket 16, and is urged to that projecting position by a spring 72 which is held in a seat 71'. Thus when brackets 15 and 16 are moved to their retracted positions as shown in Figure 26, brackets 69 still have their front tips 69' in contact with the nearest envelope of the stack to the left and thereby hold it in its proper position while the next pair of envelopes to the right is being advanced to the left, to become part of the stack as shown in Figure 27. The action of brackets 69 therefore insures against the misalignment of the envelopes in the stack during the time that the back end thereof is not being held by the brackets 15 and 16.

The mechanism for supporting the bottom of the envelope stack and for determining the number of envelopes therein is shown at the left in Figures 1, 2 and 3, and elements of the mechanism are shown in Figures 30 and 31. Referring particularly to Figure 31, the side walls of the stack accumulating enclosure comprise extensions 243'' of angle bars 243'. The bottom of this enclosure is formed by flange 67 which is pivotally mounted on the bottom edge of one extension 243'' by means of pin 66 and which is urged to the stack engaging position shown by coil spring 68. Also mounted upon one of the extensions 243'' is a bracket 73 (see Figure 1) within which rod 77 is slidably supported. On the right-hand end of rod 77 is a stack-contacting plate 76, which is rectangular, and which is adapted to rest against the face of the front envelope in the stack. An angular inclination of the entire assembly relative to the horizontal (which for example may be 45°) insures that rod 77 and plate 76 will move by gravity to engage firmly the first envelope of each stack as it emerges from the conveyer, but to engage it lightly enough to permit the adding of more envelopes to the stack. The left-hand end of rod 77 carries a stop 78 which limits the sliding of the rod toward the conveyer. The distance plate 76 moves to the left is used to determine the number of envelopes that are accumulated in each stack. A trip and release mechanism, to be described below, actuated by plate 76, are provided for depositing each stack into a carton.

During cartoning operations, the cartons themselves are fed by gravity automatically from a chute at the left of the machine and arrive along the direction of arrow *e* in Figure 29 with the leading carton being directed by two guide plates 80 and 81 to the proper place directly beneath the stack accumulating enclosure. The carton guiding and receiving mechanism is adapted to handle cartons of various sizes and capacities as will be seen by reference to Figure 33. Here the various loading zones are indicated at A, B, C, and D. It is assumed that the cartons arrive along path E and are removed along path F. A small carton may comprise, for example, the space A which accommodates eight envelopes while a larger carton may comprise the spaces A and B and be filled with sixteen envelopes all at one time. However, an even larger carton may be filled with one stack occupying the spaces A and B, and another stack occupying spaces C and D. To accommodate all types of cartons, rail 81 has an adjustable carton-guiding bracket 81' which, as seen in Figure 2, is clamped to it by bolt 89 extending through slot 88.

Directly over the stack accumulating enclosure, there is a positioner bracket 95 which has an upwardly extending portion 96 (see Figure 23) which supports it through pinions 98 and 98' running between arms 97 and 97' which are in turn pivotally supported by pins 99 and 99' in fixed brackets 100 and 100'. Operating arm 149 clamped to shaft 99 extends through opening 150 in the machine frame, and is mechanically connected through a joint 151 and pin 152 to the end of an operating lever 153. As shown in broken lines in Figure 35, lever 153 and arm extension 154 together form a bell crank pivoted at 155. This crank is urged clockwise by spring 146 so that roller 156 is held against cam 157 which is mounted upon shaft 234 previously referred to in connection with Figure 7. Hence, during the operation of the machine, the rotation of shaft 234 rocks the slide assembly, and simultaneously turns cam 157 which forces the bell crank counterclockwise. This force acts through shaft 99 (see Figure 23) to lift the stack pusher unit including bracket 95 when the unit is in its down position. The pusher unit is retained in its raised position by dog 111 which engages ledge 96'' of plate 96' fastened to arm 96 as shown in Figure 21. Dog 111 is pivoted at 12 on bracket 11 which extends from frame 10, and its movement is controlled by an operating arm 106 which is pivoted to the dog at 110. The left-hand end of arm 106 is pivoted to link 107 whose lower end is pivoted at 108 to a fixed point on an extension arm 243''. Link 107 together with arm 106 and dog 111 are spring-urged to the latch position by a tension spring connected to link 107 as shown. Arm 106 has a slot 105 within which an adjustable stop 112 is positioned. Behind this stop and engageable with it is arm 101 which is pivoted at 102 from bracket 75. Arm 101 is spring-urged counter-clockwise by a spring 104' attached between a point on bracket 75 and arm 104, the latter being adjustably clamped to arm 101 by screw 103' and slot 103 to permit variation of the spring tension. The lower end of lever 101 carries a trip arm which projects to the right and which is engaged by plate 76 when the plate approaches bracket 75. This bracket is so adjusted that plate 76 fully engages the trip arm when the desired number of envelopes has been accumulated in the stack. Lever 101 then moves against stop 112, and this movement is transmitted through arm 106 to dog 111 thereby unlatching the stack pusher unit. Spring 146 now acts to lower the unit to its down position (see Figure 24) thus filling carton 91 with the stack of envelopes. The pusher unit is returned to its raised position by cam 157 in the manner described.

While a stack is being deposited into a carton, it is important that the top flaps on the carton be held out of the way. Accordingly, as shown best in Figure 30, there is provided a wing 118 hinged to cross plate 116 and urged to the position shown by spring 117 and, as shown in Figure 21, a wing 113 hinged by pin 114 to bracket 73 and urged by gravity to the position shown. As the envelopes are pressed downward, these wings push the flaps of the carton back in the manner indicated in Figure 24.

Immediately after a stack has been deposited in a carton, the carton is moved transversely in the direction of the arrow *f* by the mechanism shown best in Figures 23, 24, 32 and 34. When single stack cartons such as carton 91, are to be filled, the guide rails or brackets 80 and 81' are appropriately positioned as shown in Figure 29. Under such circumstances, the right-hand end of the carton is supported upon a ledge 82' of the guide bracket 82, and the bottom of the carton is supported by plate 83. Beneath bracket 82 there is mounted a box frame 120 which is part of the base of the machine and which extends beneath the table support provided for the cartons. Mounted within this box frame and slideable on fixed shaft 121 between the positions shown in Figures 23 and 24 is carton pusher slide 122. Slide 122, which is shown best in Figure 34, consists of a tubular base portion 128 and an upstanding wall portion 127. Adjustably mounted upon the wall portion 127 is a plate bracket 144 which has a cut-out portion 144' and which is positioned (see Figure 21) at the level of the frame table 83 to assist in supporting the cartons. The wall portion 127 carries two rigid stud shafts 126 and 131 which have collars 129 and 130 respectively. Shaft 126 extends beyond its collar and is connected by a link 125 to the lower end of an operating arm 123. Referring to Figure 23, link 123 is rigidly mounted on shaft 99 and moves from the position of Figure 23 to that of Figure 24 during the moving of a stack into a carton. This movement of arm 123 moves the slide 122 back and forth at the proper times. Slide 122 also has mounted upon its stud shafts 126 and 131 a pair of swingable feelers 132 and 133 respectively, which are both biased counter-clockwise by means of springs 137 and 142. These springs are connected between fixed points on wall 127 and the respective one of sleeves 135 and 138. Each of the latter is rigidly fixed to a respective feeler arm. Sleeve 135 carries a trigger arm or finger 134 which is adapted to engage stud 141 on arm 139 fixed to sleeve 138 when arms 132 and 133 are positioned as shown in Figures 23 and 24. However, when arm 132 is depressed as shown in Figure 32, finger 134 is moved and arm 133 rises.

Assuming that a carton 91 is positioned as shown in Figure 23, and that a stack of envelopes 299 has been assembled, when the stack pusher unit is released it moves downward and places the stack in the carton as shown in Figure 24. During this depositing movement slide 122 moves to the left and spring 126 moves arm 132 to its elevated position at the left of carton 91.

As these elements return to their positions in Figure 23, the carton is engaged by the end of arm 132 and pushed along the guide bracket 82 in the direction of arrow *f* to an exit chute not shown. A new carton then immediately slides into position for receiving the next stack of envelopes.

The carton-handling mechanism is also adapted to handle larger cartons, such as carton **91*a* in Figure 32. When filling such cartons, each carton is slid into place at the time slide 122 is positioned as shown in Figure 23. The right half of the carton is subsequently filled and slide 122 moved to the position shown in Figure 32, arm 132 being held down by its contact with the bottom of the carton. Arm 133 is thus released to its upright position and when slide 122 is again moved to the right, arm 133 pushes the carton with it so that the next stack of envelopes may be deposited in the left-hand half of the carton. After both halves have been filled, the carton is pushed to the exit chute in the usual manner. The proper initial filling position of each carton whether single or double is insured by swinging guide arm 90 and adjustable guide 80 as shown in Figure 29. Arm 90 is pivoted on pin 92 carried by bracket 93 and urged to the position shown by spring 94**. As the carton is shifted in the direction of arrow *f*, arm 90 swings counter-clockwise so that the carton passes freely. The sequence of operations just described in connection with a double carton is shown step-by-step in order in Figures 40*a* through 40*e*.

The foregoing description is intended in illustration and not in limitation of the invention. Various modifications and changes in the structures and mechanisms shown and variations in their operation will occur to those skilled in the art and these changes, modifications and variations may be made without departing from the spirit or scope of the invention as set forth.

I claim:

1. In a machine for cartoning relatively thin flat packages, receiving means for receiving the individual packages to be cartoned, grouping means supplied by said receiving means for arranging said packages into groups, moving means for advancing each of said groups to a stack-accumulating zone, stack-accumulating means for receiving the groups of packages supplied by said moving means, sensing means for sensing the size of the stack of packages in said stack-accumulating means, and loading means actuated by said sensing means for disposing of said stack into receiving cartons.

2. A machine as in claim 1 in which said grouping means is adapted to group said packages into pairs in which each package is inverted with respect to the other package.

3. A machine as in claim 1 in which said moving means advances said groups with the faces of each package in the group perpendicular to the direction of advance.

4. A machine as in claim 3 in which said moving means includes package holding brackets and package advancing rails operated in conjunction with each other so that each of said groups of packages is alternately unclamped and clamped by the former and in sequence clamped, advanced and unclamped by the latter whereby step-by-step movement of said groups toward the stack-accumulating zone is obtained.

5. A machine as in claim 1 in which said stack-accumulating means is adapted to hold a stack of packages of any predetermined number within a range of numbers.

6. A machine as in claim 1 in which said sensing means for sensing the stack size can be set to actuate said loading means at the instant a stack of desired size has been accumulated.

7. A machine as in claim 1 in which said loading means includes filling means for engaging all of said stack of packages in the stack accumulating means and then placing the stack into a receiving carton.

8. A machine as in claim 7 in which said loading means also includes carton positioning means operated in conjunction with said filling means whereby an unfilled carton is positioned in proper filling position for each subsequent operation by said filling means which is necessary completely to fill the carton.

9. In a cartoning machine receiving packages in a given order and spaced at integral multiples of a fixed distance, an inverting and pairing mechanism including a slide plate for passing the packages to a pairing zone, a pairing platform synchronized with the arrival of said packages and cyclically reciprocated relative to said slide plate during every other interval at which a package could be or is received, whereby said platform inverts relative to the receive order of the packages the packages passed to the pairing zone in alternate intervals but does not invert those passed in the other intervals, a pusher arm synchronized with said platform for pushing out of the pairing zone the package or packages which have accumulated there during the inverting and the non-inverting portions of one cycle of said platform, and means located beyond said pairing zone for determining whether said package or packages have been properly paired in said pairing zone and if so for passing the pair along to a stacking zone but if not for disposing of whatever package or packages are pushed out of the pairing zone.

10. In a cartoning machine receiving packages in a given order and spaced at integral multiples of a fixed distance, a stack-disposing and carton-loading mechanism including a stack-accumulating enclosure for receiving a number of packages, a moving plate forming the back end of said enclosure and adapted to engage the front package in each stack and to move back as more packages are added to the stack, an adjustable trip arm actuated by said plate as it moves to a certain point, a loading plate adapted to engage the packages in said stack and to push them into cartons, said loading plate being actuated by said trip arm when the stack is full, carton guiding rails and deflecting plates for depositing an unfilled carton opposite said loading plate and stack prior to the filling of said stack, and feeling and pusher arms synchronized with said loading plate for determining the size of carton and for placing the various loading zones of each carton in loading position opposite said loading plate as often as required to fill the carton completely with packages and to dispose of said carton when it is filled.

11. The machine as in claim 13 wherein, said loading plate is returned immediately after loading to its rest position where it is latched in place, the wall of said stack accumulating enclosure opposite said loading plate is biased sufficiently to hold the stack in place but not sufficiently to interfere with the pushing of the stack into a carton, said guiding rails and deflecting plates are adjustable and position a carton having one or more loading zones to be filled in the proper place behind the wall of said enclosure prior to filling and in further combination with a latching and a sliding mechanism linked to said loading plate to actuate said feeling and pusher arms when said loading plate is returned to its rest position to advance the filled loading zones of each carton out of the way of the next loading operation by said loading plate.

12. In a cartoning machine: receiving means adapted to receive thin relatively flat packages and to discharge them at spaced intervals and in fixed order; an inverting and grouping mechanism including a slide plate for guiding said packages moving downward by gravity, a rail-like platform positioned beneath said slide plate for receiving packages therefrom, said platform adapted for movement back and forth relative to said slide plate, a back plate fixed at right angles to said platform and positioned to support the back face of a package resting edgewise on said platform, said platform and said back plate being synchronized with the discharging intervals of said receiving means so that during every other interval packages will fall down to the rail-like platform without being inverted but so that by engagement with an edge of the back plate and an edge of the slide plate which are moved relative to each other the remaining packages falling to the platform are somersaulted about a moving axis parallel to their leading edges and fall to the platform in inverted position, said platform being retained under the slide plate in package receiving position only for two receiving intervals, then being moved forward a sufficient distance to discharge to a conveying mechanism the package or packages which have been received and then being returned under the slide plate in package receiving position to repeat its cycle; a conveyor mechanism including packaging retaining fingers adapted for holding each group of packages discharged from said rail-like platform only if said group consists of two properly paired packages each inverted relative to the other and together having the proper thickness and if said packages are properly paired for passing them to package holding and advancing means but if said packages are improperly paired or if there is only one package in a group for disposing of said group before it reaches said package holding and advancing means, and package holding and advancing means for receiving the packages passed by said package retaining fingers, said holding means comprising holding rails adapted to engage and hold said packages along the edges thereof and being moved cyclically in and out of package holding position, said advancing means comprising bracket rails moved back and forth and adapted to engage and hold said packages when moving forward but to release them when moving back, said holding means synchronized with said advancing means so that during forward motion of the bracket rails, the holding rails are out of package holding position and during backward motion of the bracket rails the holding rails are in package holding position whereby step-by-step advance of said packages to a stacking zone is obtained; and a carton stacking mechanism including a stack-accumulating enclosure at the end of said package holding and advancing means for receiving and stacking the packages advanced by the latter, a stack-engaging plate at the back end of said enclosure adapted to engage the front face of a first package as it advances into the stacks and to move back as other packages are added, a trip arm actuated by said engaging plate at the instant a predetermined number of packages has entered said enclosure, an overhead pusher plate for pushing the packages in a stack down into receiving cartons and actuated by said trip arm when the stack is filled, a bottom hinge plate of said enclosure for supporting the stack of packages before loading but adapted to swing down during loading to permit the stack of packages to pass into the receiving carton, carton guiding and receiving rails for positioning an unfilled carton in the proper position under said bottom hinge plate prior to loading, carton finger arms for positioning the successive unfilled loading zones of each carton successively in proper position for filling and then for disposing of a completely filled carton, and means for moving said pusher plate to its loading position when said trip arm is actuated and for returning said pusher plate to its overhead position immediately after loading said means also operating said carton finger arms so that when the pusher plate is returned to its overhead position the receiving carton is properly repositioned or advanced.

13. In the method of cartoning relatively thin flat packages each of substantially non-uniform thickness in stacks of a predetermined number the steps of, arranging said packages into groups which may or may not be of more nearly uniform thickness, sensing the thickness of each of said groups, diverting those groups not of proper thickness to a rejection zone, advancing the remaining groups group by group to a stacking zone until a stack of the predetermined size is assembled, and loading the stack in the stacking zone into a carton.

14. In a cartoning machine adapted to handle relatively limp, thin packages having four corners and a generally square or rectangular configuration such as tea-bags and the like, a package-moving mechanism comprising two pairs of longitudinally extended and substantially parallel-holding brackets, said brackets forming a parallel series of spaced package-holding recesses adapted to hold said packages in a column each standing on edge and to hold each package near each of the four corners thereof, said brackets being adapted to hold said packages against movement in the backward longitudinal direction but to permit movement in the forward longitudinal direction, and a pair of package-moving rails, each rail spaced between a pair of said brackets, said rails having slots adapted to hold said packages on opposite sides near the centers thereof, said slots having depressable walls defined by pivoted bracket fingers lightly spring urged inward but cammable outward in one direction only so that said slots can hold said packages during movement in the forward direction but will disengage and slip by the edges of said packages when said rails are moved backward, and means for moving said rails cyclically backward and forward longitudinally whereby said packages are moved forward step-by-step.

15. The combination of elements as in claim 14 in which said holding brackets have rigid walled recesses and in further combination with means synchronized with the longitudinal backward and forward movement of said moving rails for cyclically moving said brackets laterally into and out of packages holding position so that said packages are held by said brackets when said rails move backward and are not held by said brackets when said rails move forward.

16. A cartoning mechanism for automatically filling cartons of different sizes comprising means for supplying empty cartons in given orientation to a filling zone, a filling mechanism for loading individual stacks of packages into unfilled space in each carton, and means operated at the end stroke of said filling mechanism for advancing an unfilled space of a carton into filling position, said means including two sensing fingers, one of which is forward and is adapted to bear against a carton if it has unfilled space at the end of a filling operation and to cause the other finger to be engageable with said carton to advance an unfilled part thereof at the proper time into filling position, said forward finger acting when a filled carton is present at the end stroke of said filling mechanism to engage with said carton and to push it to a receiving zone.

17. The combination of elements as in claim 16 in which said cartons are received at said filling zone from one direction, and in further combination with a sliding frame carrying said fingers and which is movable back and forth transverse to said direction, said frame being linked to said filling mechanism so that at the end stroke thereof, said frame is moved transversely a distance substantially the same as the width of a stack of packages.

18. In a machine handling packages each having substantially non-uniform thickness, a pairing and grouping mechanism comprising, supply means for supplying packages generally in sequence in a given orientation and at regular intervals but permitting some packages to be out of sequence, means including a slide plate for directing downward said packages as they pass from said supply means, a back plate positioned below said slide plate and lying in a plane substantially parallel thereto, said back plate having a front face adapted to contact said packages and having an extension arm extending at an angle from its back face near the upper edge thereof, and means for cyclically moving said back plate forward and backward in a direction generally at right angles to the direction of movement of said packages along said slide plate, said means being synchronized with said supply means so that said packages can be grouped in pairs, the thickness of a pair being more nearly uniform than the thickness of a single package.

19. The combination of elements as in claim 18 in further combination with a platform below said back plate and lying generally perpendicular thereto, this platform being adapted to catch said packages as they move down said back plate and upon which said packages can be grouped in pairs before being advanced to a cartoning zone.

20. The combination of elements as in claim 19 in which said back plate is moved cyclically forward and backward after each two package intervals so that there is time for only two packages to be caught by said platform whereupon said back plate is then moved to push any package or packages on said platform toward a conveying zone before the next package could arrive, and in further combination with sensing means for testing the thickness of each package or packages pushed toward the conveying zone and for accepting only those packages correctly paired in groups of proper thickness.

21. The method of preparing small individual packets, such as tea bags or the like, having substantially non-uniform thickness for cartoning with a minimum of waste space comprising the steps of, arranging said packets generally in the same orientation in a sequence of regularly spaced intervals but permitting one or more packets to be out of sequence, receiving each of said packets in sequence without regard for the possible absence of a packet in one or more intervals and attempting to place into pairs the packets in each two successive intervals by inverting one packet of a pair relative to the other packet and placing them face-to-face so that the thickness of the pair is more nearly uniform than the thickness of a single packet, sensing whether each attempted pairing of said packets was successful, and advancing each properly paired pair of packets into a group, but rejecting each improperly paired packet or packets, if any.

22. In a machine for cartoning relatively thin flat packages such as tea bags, receiving means for receiving the individual packages to be cartoned, grouping means supplied by said receiving means for arranging said packages into groups, moving means for advancing each of said groups to a stack-accumulating zone, means for determining the size of each group and for disposing of each group not of predetermined size before said group reaches the stack-accumulating zone, said means including at least one pair of opposed fingers which are adapted to engage and hold in turn each group of proper size during advance of said group from said grouping means and then to free said group so that it may continue its advance to the stack accumulating zone, said fingers being adapted not to hold a group of improper size so that it will be disposed of before it reaches the stack-accumulating zone, stack-accumulating means for receiving the groups of packages supplied by said moving means, sensing means for sensing the size of the stack of packages in said stack-accumulating means, and loading means actuated by said sensing means for placing said stack into receiving cartons.

References Cited in the file of this patent

UNITED STATES PATENTS

| | | |
|---|---|---|
| 522,139 | Wood | June 26, 1894 |
| 748,934 | Doedt | Jan. 5, 1904 |
| 1,217,923 | Donnelly | Mar. 6, 1917 |
| 1,330,639 | Leumann | Feb. 10, 1920 |
| 1,659,143 | Hopkins | Feb. 14, 1928 |
| 1,951,371 | Price et al. | Mar. 20, 1934 |
| 2,296,802 | Thompson | Sept. 22, 1942 |
| 2,332,672 | Schmitt | Oct. 26, 1943 |
| 2,335,670 | Harvey | Nov. 30, 1943 |
| 2,587,690 | Brereton | Mar. 4, 1952 |
| 2,651,896 | Woodruff et al. | Sept. 15, 1953 |

UNITED STATES PATENT OFFICE

CERTIFICATE OF CORRECTION

Patent No. 2,860,460 November 18, 1958

Adolf G. F. Rambold

It is hereby certified that error appears in the printed specification of the above numbered patent requiring correction and that the said Letters Patent should read as corrected below.

Column 11, line 47, for the claim reference numeral "13" read -- 10 --.

Signed and sealed this 9th day of June 1959.

(SEAL)
Attest:

KARL H. AXLINE
Attesting Officer

ROBERT C. WATSON
Commissioner of Patents